United States Patent [19]

Elfert et al.

[11] 4,221,903

[45] Sep. 9, 1980

[54] SEMIPERMEABLE MEMBRANES OF HETEROCYCLIC COPOLYAMIDES

[75] Inventors: Klaus Elfert, Krefeld; Gerhard D. Wolf, Dormagen; Francis Bentz, Cologne; Hans E. Künzel, Dormagen, all of Fed. Rep. of Germany

[73] Assignee: Bayer Aktiengesellschaft, Fed. Rep. of Germany

[21] Appl. No.: 927,609

[22] Filed: Jul. 24, 1978

Related U.S. Application Data

[63] Continuation of Ser. No. 746,728, Dec. 2, 1976, abandoned.

[30] Foreign Application Priority Data

Dec. 6, 1975 [DE] Fed. Rep. of Germany ....... 2554922

[51] Int. Cl.$^2$ ............................................. C08G 69/32
[52] U.S. Cl. ............................ 528/341; 210/500 M; 260/30.2; 264/184; 428/36; 528/183; 528/185; 528/193; 528/194; 528/220; 528/229; 528/327; 528/331; 528/336; 528/340; 528/348
[58] Field of Search ............... 528/341, 183, 185, 193, 528/194, 220, 229, 331, 327

[56] References Cited

U.S. PATENT DOCUMENTS

| | | | |
|---|---|---|---|
| 3,567,632 | 3/1971 | Richter et al. | 528/341 |
| 3,664,986 | 5/1972 | MacDonald | 528/341 |
| 3,696,031 | 10/1972 | Credali et al. | 528/341 |
| 4,123,424 | 10/1978 | Credali et al. | 528/341 |

OTHER PUBLICATIONS

Advanced Organic Chemistry—Royals, p. 412.

*Primary Examiner*—Harold D. Anderson
*Attorney, Agent, or Firm*—Connolly and Hutz

[57] ABSTRACT

The invention relates to semipermeable membranes with a water absorption capacity of from 4.5 to 11% by weight, preferably from 4.5 to 8% by weight, as measured on approximately 40μ thick symmetrical films at room temperature and at 65% relative air humidity, a throughflow of 130 to 200 l/m$^2$d for a desalination level of 94.6 to 99.5% and consisting of an aromatic heterocycle-containing copolyamide with a relative viscosity of ≧1.4, as measured on a 0.5% N-methyl pyrrolidone solution at a temperature of 20° C.

12 Claims, No Drawings

SEMIPERMEABLE MEMBRANES OF HETEROCYCLIC COPOLYAMIDES

This is a continuation of application Ser. No. 746,728, filed Dec. 2, 1976, now abandoned.

This invention relates to semipermeable membranes and hollow filaments of aromatic, heterocycle-containing copolyamides which are particularly suitable for inverse osmosis and ultrafiltration, and to the production of these membranes.

Inverse osmosis and ultrafiltration are mass separation processes which are particularly economical because of the low energy costs involved, since in such forms of mass separation, in contrast to separation by distillation, there are no phase changes of the solvent, and temperatures around ambient temperature are normally applied.

The principle of inverse osmosis has been known for some time. In inverse osmosis, solvents migrate from a solution of a relatively high concentration through a semipermeable membrane into a solution of lower concentration under the effect of an applied pressure which is above the osmotic pressure of the system. In this way, it is possible, for example, to separate dissolved substances from the solvent.

Examples of technical application of this separation process are the desalination of sea water or brackish water, the purification of contaminated water for the production of drinking water or industrial water, also the concentration, removal or recovery of a variety of different substances from aqueous solutions, for example the concentration of food stuffs or the separation or concentration of biological or pharmaceutical products.

Although numerous installations for the industrial application of inverse osmosis and ultrafiltration are already in operation, the provision of suitable membranes is still one of the main problems of this process. Numerous polymers have been tested for their suitability as a membrane material. They have to satisfy certain reqirements in regard to their permeability and their selectivity and, in addition, have to be chemically, thermally and mechanically stable. Membranes of cellulose acetate and of aromatic polyamides have hitherto mainly been used for commerical purposes. It was only as a result of the development of the asymmetrical cellulose acetate membranes by Loeb and Sourirajan (cf. U.S. Pat. No. 3,133,132) that it became possible to produce membranes with satisfactory properties, i.e. high throughflow rates coupled with a high separation capacity. However, cellulose acetate membranes show certain disadvantages in regard to their chemical and thermal stability. They are readily hydrolysed under acidic or alkaline conditions and are degraded by microorganisms. This means that their filtration properties gradually deteriorate which restricts the useful life and, hence, the general serviceability of cellulose acetate membranes. In addition, the membrane is compressed under the effect of applied pressure, resulting in a reduction in the throughflow rate.

Aromatic polyamides, of the type described for example in German Offenlegungsschrift Nos. 1,941,022 and 1,941,932 and in U.S. Pat. No. 3,567,632, are also suitable for the production of asymmetrical semipermeable membranes. In particular, they are superior to the cellulose acetate membranes in their resistance to chemical and thermal influences. One of their disadvantages, however, is their lower permeability to water in comparison with cellulose acetate membranes.

The permeability to water of a plastics material is related to its water absorption capacity. Cellulose acetate which as a membrane material is characterised by high flow rates coupled with high selectivity, has a water content of from 10 to 15%. By contrast, poly-m-phenylene isophthalic acid amide has a water content of from 3.8 to 4%, as measured on an approximately 40μ thick symmetrical film, and accordingly has a low throughflow rate.

Another of the nitrogen-containing polycondensates commonly used in membrane technology is poly-(2,2'-(m-phenylene)-5,5'-bis-benzimidazole) which has a water absorption capacity of 11 to 13% (as measured on filaments at room temperature/65% relative air humidity) and, as expected, a high throughflow rate. In contrast to cellulose acetate, however, this condensate has only very limited selectivity. In the case of N-containing condensates, therefore, the impression is formed that high throughflow rates are coupled with low selectivities.

The object of the present invention is to obviate the disadvantages referred to above and to develop semipermeable membranes with a high chemical and thermal resistance which are characterised by high permeability to water coupled with high selectivity.

Accordingly, it has surprisingly been found that it is possible to produce from certain copolyamides with an increased water absorption capacity polymer membranes which thus show increased permeability to water coupled with very high selectivity.

Accordingly, the present invention provides semipermeable membranes with a water absorption capacity of from 4.5 to 11% by weight, preferably from 4.5 to 8% by weight, as measured on approximately 40μ thick symmetrical films at room temperature and at 65% relative air humidity, a throughflow of 130 to 200 $l/m^2d$ for a desalination level of 94.6 to 99.5% and consisting of an aromatic heterocycle-containing copolyamide with a relative viscosity of $\geq 1.4$, as measured on a 0.5% N-methyl pyrrolidone solution at a temperature of 20° C.

Preferred membranes are membranes of an aromatic, heterocycle-containing copolyamide of (A) 10 to 95 mole %, preferably 50 to 90 mole % of one or more unit(s) corresponding to formula I to IV below

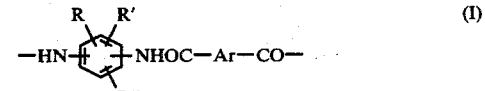

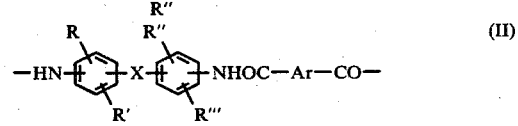

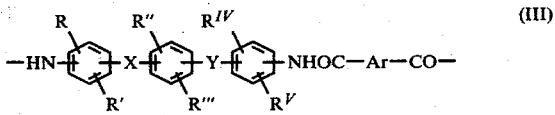

$$-HN-\underset{R'}{\overset{R}{\bigcirc}}-X-\underset{R'''}{\overset{R''}{\bigcirc}}-Y-\underset{R^V}{\overset{R^{IV}}{\bigcirc}}-Z-\underset{R^{VII}}{\overset{R^{VI}}{\bigcirc}}-NHOC-Ar-CO- \quad (IV)$$

in which
R, R', R", R''', $R^{IV}$, $R^V$, $R^{VI}$ and $R^{VII}$ independently represent hydrogen, $C_{1-4}$ alkyl or halogen,
Ar represents an optionally alkyl-substituted or halogen-substituted bivalent aromatic radical, preferably phenylene, naphthylene, biphenylene or a radical corresponding to the formula and
X, Y and Z independently represent a direct bond or bridge members corresponding to the formulae —CONH—, —NHOC—, —O—, —OCONH—,
—NHCOO—, —CH$_2$—, $-\overset{\overset{CH_3}{|}}{\underset{\underset{CH_3}{|}}{C}}-$, —SO$_2$—,
—NHCONH—, —COO—, —OOC— or $-\overset{\overset{}{\|}}{\underset{\underset{O}{}}{C}}-$ and of
(B) 5 to 90 mole % and preferably 10 to 50 mole % of units corresponding to the formula (V)

—HN—T—NH—OC—Ar—CO—  (V), in which
Ar is as defined above and
T represents a bivalent heterocyclic radical which contains one or more aromatic or heterocyclic radicals optionally condensed, with a relative viscosity of $\geq 1.4$, as measured on a 0.5% N-methyl pyrrolidone solution at a temperature of 20° C.

Starting polymers particularly suitable for the production of the semipermeable membranes consist of an aromatic, heterocyclic-containing copolyamide of
(A) 10 to 95 and preferably 50 to 90 mole % of one or more unit(s) corresponding to the formulae $$-HN-\underset{R''}{\overset{R\quad R'}{\bigcirc}}-NHOC-Ar-CO- \quad (I)$$

$$-HN-\underset{R'}{\overset{R\quad R''}{\bigcirc}}-X-\underset{R'''}{\overset{}{\bigcirc}}-NHOC-Ar-CO- \quad (II)$$

$$-HN-\underset{R'}{\overset{R\quad R''}{\bigcirc}}-X-\underset{R'''}{\overset{R^{IV}}{\bigcirc}}-Y-\underset{R^V}{\overset{}{\bigcirc}}-NHOC-Ar-CO- \quad (III)$$

—continued
$$-HN-\underset{R'}{\overset{R\quad R''}{\bigcirc}}-X-\underset{R'''}{\overset{R^{IV}}{\bigcirc}}-Y-\underset{R^V}{\overset{R^{VI}}{\bigcirc}}-Z-\underset{R^{VII}}{\overset{}{\bigcirc}}-NHOC-Ar-CO- \quad (IV)$$

in which
R, R', R", R''', $R^{IV}$, $R^V$, $R^{VI}$ and $R^{VII}$ independently represent hydrogen, $C_{1-4}$-alkyl or halogen,
Ar represents an optionally alkyl- or halogen-substituted bivalent aromatic radical, preferably m- or o-phenylene, naphthylene, biphenylene or a radical of the formula and
X, Y and Z independently represent a direct bond or bridge members of the formulae —CONH—, —NHOC—, —O—, —OCONH—,
—NHCOO—, —CH$_2$—, $-\overset{\overset{CH_3}{|}}{\underset{\underset{CH_3}{|}}{C}}-$, —SO$_2$—,
—NHCONH—, —COO—, —OOC— or $-\overset{\overset{}{\|}}{\underset{\underset{O}{}}{C}}-$ and of
(B) 5 to 90, preferably 10 to 50 mole % of units corresponding to the formula (V)

—HN—T—NH—OC—Ar—CO—  (V), in which Ar is as defined above and T represents a bivalent heterocyclic radical which contains one or more aromatic or heterocyclic radicals optionally attached by condensation, with a relative viscosity of $\geq 1.4$, as measured on a 0.5% N-methyl pyrrolidone solution at a temperature of 20° C.

Particularly preferred semipermeable membranes are semipermeable membranes of the copolyamides defined above, in which
X in formula (II) represents —O—, —NHCO—, —NHOC—;
X and Y in formula (III) represent —O—, —NHOC—, —CONH—, —NHCOO—, —COO—, —OOC—, —NHCONH— or combinations of these bridge members; and
X and Y in formula (IV) represent —O—, —CONH— or —NHCO—; and represents —SO$_2$— or $-\overset{\overset{CH_3}{|}}{\underset{\underset{CH_3}{|}}{C}}-$ T in formula (V) is preferably derived from a diamine with a quinazolin dione structure; and preferably represents the m- or p-phenylene radical.

In the context of the invention, copolyamides are co-condensates of aromatic diamines and aromatic dicarboxylic acid dichlorides, the individual components also consisting of several aromatic rings which may be attached to one another through single bonds and also through other bridge members in the form of amide structures.

The heterocycle-containing copolyamides suitable for use in accordance with the invention are produced from three components. The first component consists of one or more diamines corresponding to general formulae VI-IX below:

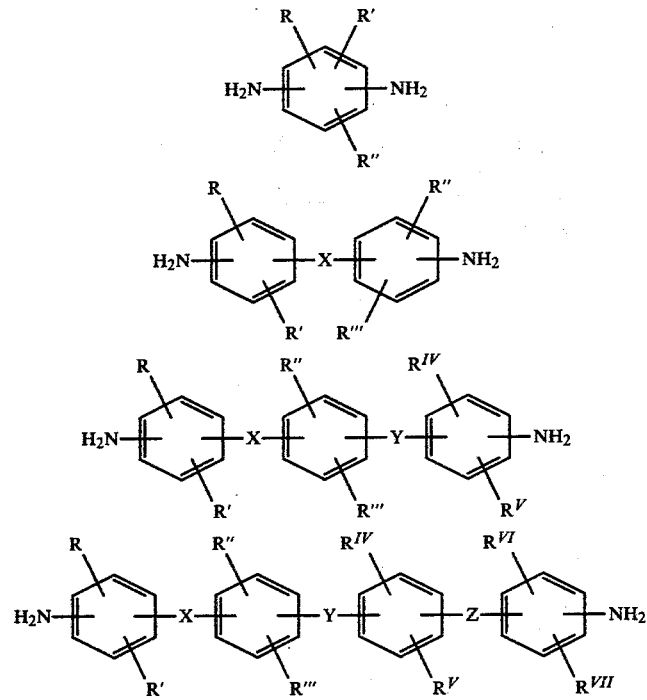

in which
R, R', R'', R''', $R^{IV}$, $R^V$, $R^{VI}$, $R^{VII}$, X, Y and Z independently are as defined above.

Suitable diamines are, for example, the diamines described in U.S. Pat. Nos. 2,989,495 (column 4, lines 1 to 70), 3,354,127 and 3,349,062.

In addition, the following diamines, for example, may be used with advantage:

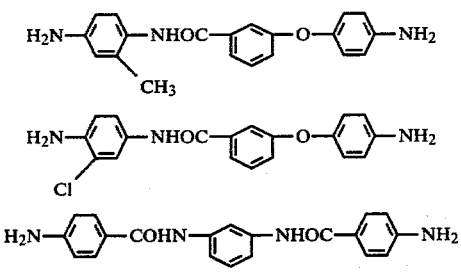

-continued

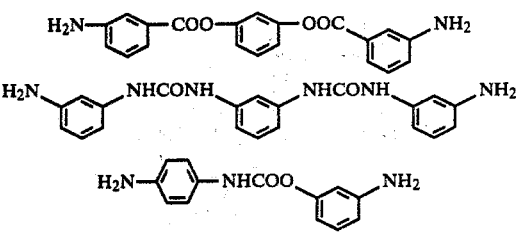

(VI)

(VII)

(VII)

(IX)

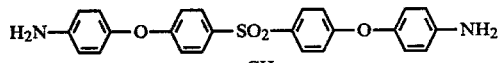
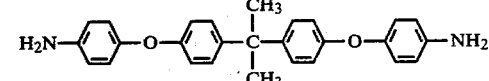

The above formulae are intended to indicate the whole number of possibilities without limiting the invention.

The second component consists of one or more heterocyclecontaining diamines which are described, for example, in the following Patents: U.S. Pat. No. 3,376,268, BE-PS No. 660,339 and German Offenlegungsschrift Nos. 1,720,687; 1,720,686; 1,720,728; 1,720,733; 1,720,754 and 1,811,411, or in the publications Makromol. Chem. 130 (1969), 103–144 and Makromol. Chem. 138 (1970) 223–250.

The following diamines are mentioned as particularly preferred examples which are intended to illustrate the whole number of possibilities without limiting the invention in any way:

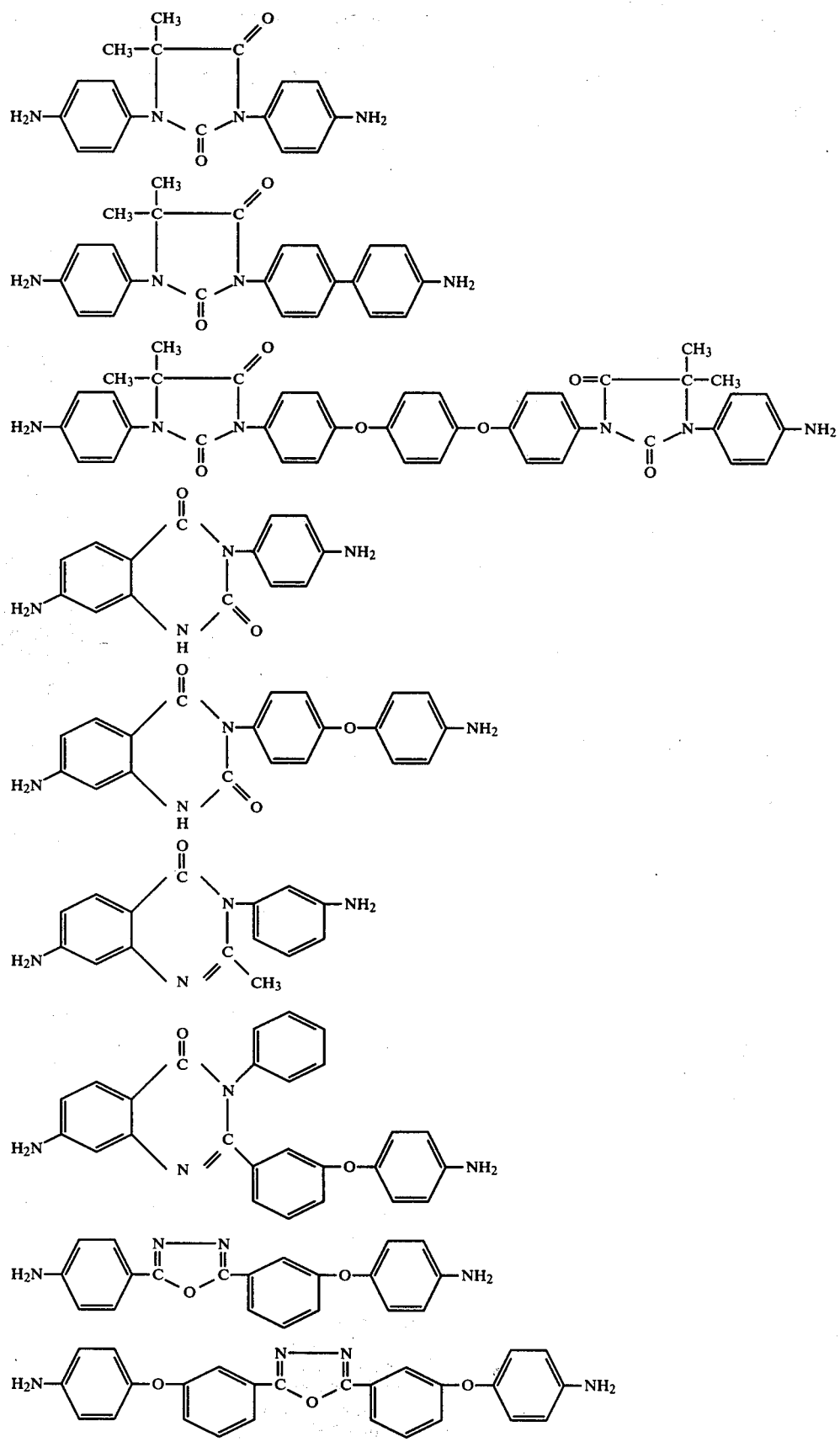

The third component, the acid component, consists of one or more aromatic dicarboxylic acid dihalide(s) corresponding to the general formula (X)

$$\text{Hal—OC—Ar—CO—Hal} \qquad (X)$$

in which Hal represents chlorine or bromine and Ar is an optionally alkyl- or halogen-substituted bivalent radical, but preferably m-phenylene, p-phenylene, biphenylene, naphthylene or a radical corresponding to the formula:

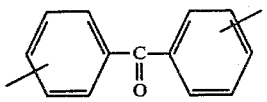

The following compounds are mentioned as preferred examples:
isophthalic acid dichloride, terephthalic acid dichloride, biphenyl dicarboxylic acid-4,4'-dichloride, naphthalene dicarboxylic acid-1,5-dichloride, naphthalene dicarboxylic acid-2,6-chloride, benzophenone dicarboxylic acid-4,4'-dichloride and the corresponding dibromide and also alkyl and halogen substitution products of the above-mentioned acid dihalides.

Polycondensation of the above described diamine and dicarboxylic acid dichloride components is carried out by methods known per se, such as interfacial polycondensation, but preferably by solution polycondensation in polar organic solvents, such as N,N-dialkyl acid amides, preferably N,N-dimethyl acetamide or N-alkyl-substituted lactams, preferably N-methyl pyrrolidone or in tetramethyl urea, hexamethyl phosphoric acid triamide or in mixtures of these polar aprotic solvents in the absence of additional acid acceptors, but optionally in the presence of solution promoters, such as alkali metal or alkaline earth metal halides where they are required for keeping the copolyamides formed in solution. The condensation reaction is carried out at temperatures in the range from $-30°$ to $+150°$ C. and preferably at temperatures in the range from $-20°$ to $+30°$ C. The reaction times may amount to between 1 and 30 hours. The solution has a solids content of from 5 to 40%, preferably from 15 to 25%. In order to obtain reaction products with as high a molecular weight as possible, it is best to use the sum of the diamines and the dicarboxylic acid dichloride component in equimolar quantities, although basically the polycondensation reaction may also be carried out with an excess of deficiency of dicarboxylic acid dichloride. The dicarboxylic acid dichloride may be added to the solution or suspension of the diamines in the solvent in several small portions over a prolonged period. In some cases, however, it is advisable to add all the dicarboxylic acid dichloride at once, preferably with cooling.

Most of the aromatic heterocycle-containing copolyamide suitable for use in accordance with the invention are soluble in polar, organic solvents such as N,N-dimethyl formamide, N,N-dimethyl acetamide or N-methyl pyrrolidone, at least when a few percent of an alkali metal or alkaline earth metal salt, such as calcium chloride or lithium chloride is added as solution promoter. These copolyamides may readily be processed by known methods to form asymmetrical membranes or hollow filaments.

The membranes produced from the copolyamides used in accordance with the invention have an anisotropic or asymmetrical structure. Asymmetrical membranes according to Loeb and Sourirajan are characterized by the following structure: a homogeneous and dense membrane layer of minimal thickness (0.1 to 0.5μ) changes substantially continuously into an underlayer with a porous structure which acts as carrier or supporting layer and has no effect upon the filtration properties. By contrast, the dense side of the membrane represents the actual selective separation layer which allows economic throughflow rates by virtue of its minimal thickness. The asymmetry of the structure is a result of the production process. In this process, a casting solution of the polymer is prepared in a suitable solvent. A film is cast from this solution and subjected to a heat treatment during which the solvent is partly evaporated and the asymmetrical structure developed. Thereafter the polymer film is coagulated in a non-solvent, the structure preformed during the heat treatment being consolidated.

The process by which the membranes are produced comprises the following steps:

1. 5 to 35% by weight, of the polymer product, based on the weight of polymer and solvent, are dissolved in a polar aprotic solvent in the presence of from 1 to 10% by weight of an alkali metal or alkaline earth metal salt, preferably LiCl, LiBr, LiNO₃, CaCl₂, CaBr₂. Preferred solvents are dimethyl formamide, dimethyl acetamide, N-methyl pyrrolidone, dimethyl sulphoxide, hexamethyl phosphoric acid triamide or mixtures thereof. Heat may optionally be applied in order to accelerate dissolution. The solution is then filtered.

2. The solution thus prepared is applied to a glass or metal substrate or to any other suitable substrate, for example a moving belt or a drum, in a layer thickness of from 150μ to 500μ.

3. This film is then subjected to a heat treatment at a certain temperature for a certain time preferably at a temperature of from 40° to 150° C. over a period of from 2 to 60 minutes.

4. After a cooling phase of 10 minutes, the film is immersed in a coagulation bath and left there for 30 minutes. Suitable coagulation liquids are solvents of the type which are miscible with the organic solvent and, at the same time, are able to dissolve the salt, but which represent a non-solvent for the polymer.

Suitable coagulation solvents are water, methanol, ethanol, and i-propanol. Water is preferably used as the coagulation liquid. The temperature of the coagulation bath may be in the range from 0° C. to 50° C., although it is preferably in the range from 0° C. to 25° C.

The present invention also provides a process for the production of semipermeable membranes by heat treating a film prepared from a polymer casting solution, the solvent being partly evaporated, and subsequently coagulating the polymer film in a non-solvent, characterised by the fact that from 5 to 35% by weight, based on the weight of copolyamide and solvent, of an aromatic copolyamide of (A) 10 to 95 mole % and preferably 50 to 90 mole % of one or more unit(s) corresponding to formulae I to IV below:

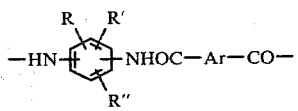

-continued

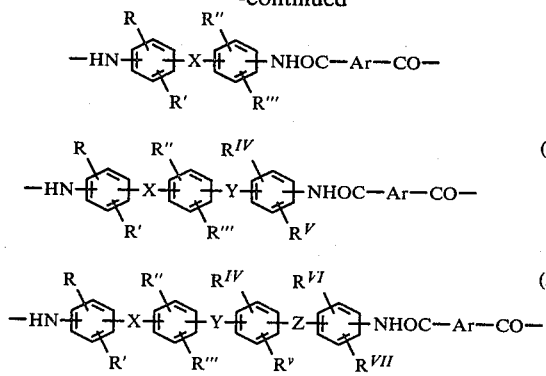

in which

R, R', R'', R''', $R^{IV}$, $R^V$, $R^{VI}$ and $R^{VII}$ independently represent hydrogen, $C_{1-4}$-alkyl or halogen, Ar represents an optionally alkyl- or halogen-substituted bivalent aromatic radical, preferably phenylene, naphthylene, biphenylene or a radical of the formula

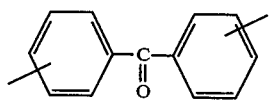

and

X, Y and Z represent a direct bond or bridge members of the formulae

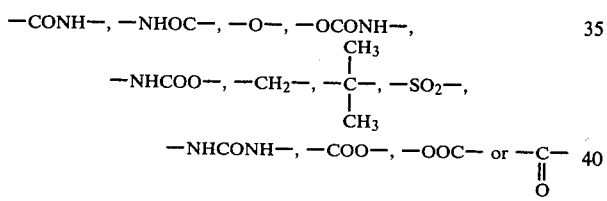

and of (B) 5 to 90 mole % and preferably 10 to 50 mole % of units corresponding to the formula (V)

—HN—B—NH—OC—Ar—CO— (V), in which Ar is as defined above and B represents a bivalent heterocyclic radical containing one or more aromatic or heterocyclic radicals optionally condensed with a relative viscosity of ≧1.4, as measured on a 0.5% N-methyl pyrrolidone solution at a temperature of 20° C., are dissolved, optionally under heat, in an aprotic solvent, such as dimethyl formamide, dimethyl acetamide, N-methyl pyrrolidone, dimethyl sulphoxide and hexamethyl phosphoric acid trisamide or mixtures thereof, optionally in the presence of from 1 to 10% by weight of LiCl, LiBr, LiNO₃, MgCl₂, CaCl₂ or CaBr₂ or in the presence of an organic amine, such as triethylamine, tripropylamine, pyridine or ethanolamine, the solution thus formed is optionally filtered and applied to a substrate in a layer thickness of from 150 to 500μ, the film thus formed is treated at a temperature of from 40° to 150° C. over a period of from 2 to 60 minutes and, after a cooling phase of 10 minutes, the film is immersed for 30 minutes at 0° to 50° C. in a coagulation bath which is miscible with the aprotic solvent, which op-
tionally contains added salt and which represents a non-solvent for the copolyamide.

The membranes according to the invention may be used in the form of flat membranes, in tubular form or even in the form of hollow fibres for use in inverse osmosis and ultrafiltration. The techniques by which tubes and hollow fibres are produced correspond accordingly to the process described above. In this case, the methods commonly used for producing tubes and hollow fibres from polymer solutions are adopted, the third and fourth of the above-mentioned treatment steps according to the invention being carried out after the shaping operation.

The moisture absorption capacities of the polymers were measured on symmetrical, approximately 40μ thick films. To this end, the films were washed at 30° C., dried and exposed for 24 hours to an atmosphere of 20° C./65% relative humidity. The films or fibres were then dried in vacuo at 80° C. The moisture absorption is expressed as the equilibrium absorption in percent of the weight of the absolutely dry films or fibres.

In order to determine the effectiveness of the membranes, the finished membrane is applied to a porous sintered plate of metal, on which a filter paper has been placed, and is introduced into a pressure osmosis apparatus in which a 3.5% NaCl-solution is pumped in a circuit past the surface of the membrane at room temperature under a pressure of 110 bars and at a rate of 15 l/h. The throughput of water through the membrane is determined and the NaCl-content measured in the usual way.

EXAMPLE 1

A copolyamide with a relative viscosity of 1.82, as measured on a 0.5% solution of the polyamide in N-methyl pyrrolidone at 20° C. (in the following Examples, the viscosities were measured under the same conditions) was produced by solution polycondensation with N,N-dimethyl acetamide as solvent from 25.9 parts by weight of m-phenylene diamine, 48.2 parts by weight of a diamine with the following structure

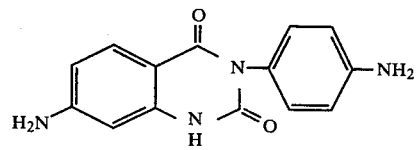

and 62.6 parts by weight of a diamine with the structure

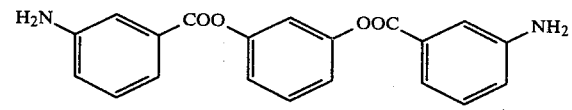

and from 122 parts by weight of isophthalic acid dichloride. This copolyamide had a moisture absorption capacity of 8.7%.

A clear solution was produced with stirring under heat (60° C.) from 12 g of the polymer, 3 g of LiCl and 85 g of N-methyl pyrrolidone. A casting solution ready for use was obtained after filtration and the removal of residual air bubbles. A film 250μ thick was applied to a glass plate and subsequently heated for 20 minutes at 90° C. on a heating plate. After a cooling phase of 10 minutes, the film was immersed in an ice/water bath and left there for 30 minutes, during which time the film detached itself from the glass plate. The film was stored in water at room temperature.

Under the conditions defined above, this membrane had a water flow of 130 l/m²d and a salt retention capacity of 99.5%.

A clear casting solution was prepared from 15 g of this copolyamide, 3.75 g of CaCl₂ and 81.25 g of N-methyl pyrrolidone. A film drawn in a thickness of 250μ was heated for 20 minutes to 100° C. The membrane test produced the following results: a throughflow of 200 l/m²d for a salt retention capacity of 98.2%.

EXAMPLE 2

A copolyamide with a relative viscosity of 1.43 was produced by the same method from 21.1 parts by weight of m-phenylene diamine, 10.7 parts by weight of a diamine with the following structure

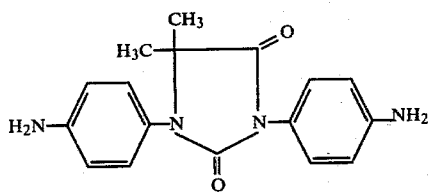

and 46.7 parts by weight of isophthalic acid dichloride. The moisture absorption capacity amounted to 5.7%.

A solution containing 9 g of the polymer, 2.25 g of LiNO₃ and 33.75 g of N-methyl pyrrolidone was prepared. A film cast in a thickness of 250μ was treated for 20 minutes at a temperature of 70° C. The membrane thus produced was tested and produced a throughflow of 103 l/m²d and a salt rejection of 99.2%.

EXAMPLE 3

A copolyamide with a relative viscosity of 1.68 was produced from 18.4 parts by weight of m-phenylene diamine, 8.1 parts by weight of a diamine with the structure

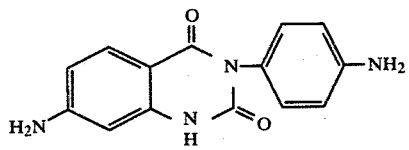

and 40.6 parts by weight of isophthalic acid dichloride. The moisture absorption capacity amounted to 8.7%.

The casting solution was prepared from 12 of the polymer, 3 g of LiNO₃ and 85 g of N-methyl pyrrolidone. A film drawn in a thickness of 250μ was treated for 20 minutes at 60° C. The membrane thus produced was tested and produced a throughflow of 260 l/m²d and a salt rejection of 98.2%.

EXAMPLE 4

12 g of a copolyamide with a relative viscosity of 1.56 and a moisture absorption capacity of 8.0%, produced from 16.2 parts by weight of m-phenylene diamine and 13.4 parts by weight of a diamine with the following structure:

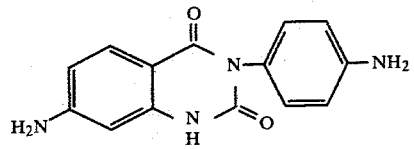

and 40.6 parts by weight of isophthalic acid dichloride, 3 g of LiNO₃ and 85 g of N-methyl pyrrolidone were dissolved. A film was cast from this solution in a thickness of 250μ and then treated for 20 minutes at a temperature of 60° C. This membrane had a throughflow of 220 l/m²d and a salt retention capacity of 98.75%.

EXAMPLE 5

12 g of a copolyamide with a relative viscosity of 1.56 and a moisture absorption capacity of 8.0%, produced from 16.2 parts by weight of m-phenylene diamine, 13.4 parts by weight of a diamine with the following structure

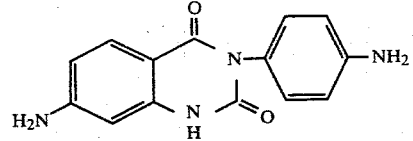

and 40.6 parts by weight of isophthalic acid dichloride, 3 g of LiNO₃ and 85 g of N-methyl pyrrolidone were dissolved. A film was cast from this solution in a thickness of 250μ and treated for 25 minutes at 60° C. This membrane had a throughflow of 293 l/m²d and a salt retention capacity of 96.4%.

EXAMPLE 6

These copolyamides can be used not only for the production of membranes for the desalination of water, but also for the production of membranes for ultrafiltration purposes. This is possible by suitably modifying the production conditions, as explained in this Example with reference to a membrane with a high permeability to water.

A casting solution was prepared from 12 g of the copolyamide of Example 3, 36 g of CaCl₂ and 84.4 g of N-methyl pyrrolidone. A film 250μ thick was drawn therefrom and treated for 5 minutes at 70° C. The finished membrane was tested with a 3% aqueous sucrose solution at room temperature under a pressure of 40 bars. The throughflow amounted to 600 l/m²d for a 99% retention.

Comparison Example

A poly-(m-phenylene isophthalic acid amide) with a relative viscosity of 2.02 was produced under standard conditions from 10.8 parts by weight of m-phenylene diamine and 20.3 parts by weight of isophthalic acid dichloride. A moisture absorption capacity of 3.8% was determined.

A film 250μ thick was drawn from a casting solution of 10 g of the polymer, 2.5 g of LiCl and 47.5 g of N,N-dimethyl acetamide, and heated for 20 minutes to 110° C. A throughflow of 72 l/m²d and a salt retention capacity of 95.8% were measured.

Compared with the other Examples, this result clearly shows the importance of a certain water absorption capacity to the effectiveness of polymer membranes in terms of a high water throughflow coupled with a high separation capacity.

What is claimed is:

1. A semipermeable membrane with a water absorption capacity of from 4.5 to 11% by weight, as measured on an approximately 40μ thick symmetrical film at room temperature at 65% relative air humidity, a throughflow of from 130 to 200 l/m²d for a desalination level of from 94.6 to 99.5% and consisting of an aromatic heterocycle-containing copolyamide (A) 10 to 95 mole% of one or more units corresponding to Formulae I-IV below:

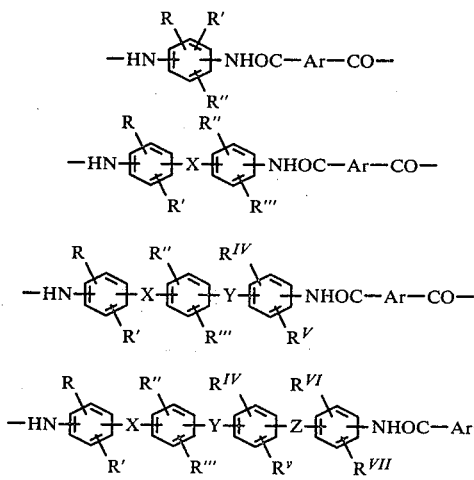

in which

R, R', R'', R''', R$^{IV}$, R$^V$, R$^{VI}$ and R$^{VII}$ which are the same or different represent hydrogen, C$_{1-4}$-alkyl or halogen;

Ar represents an alkyl- or halogen-substituted bivalent aromatic radical or an unsubstituted bivalent aromatic radical; and X, Y and Z, each represent a direct bond or a bridge member selected from the group consisting of

—CONH—, —NHOC—, —O—, —OCONH—, —NHCOO—,

—CH$_2$—, —C(CH$_3$)$_2$—, —SO$_2$—, —NHCONH—,

—COO—, —OOC— and —C(=O)— and of (B) 5 to 90 mole% of units corresponding to the formula (V)

—HN—T—NH—OC—Ar—CO— (V), in which Ar is as just defined and T represents a bivalent heterocyclic radical which contains one or more aromatic or heterocyclic radicals.

2. A semipermeable membrane as claimed in claim 1, consisting of 50 to 90 mole % of the units (A) and 10 to 50 mole % of the units (B).

3. A semipermeable membrane as claimed in claim 1 wherein bivalent aromatic radical AR is selected from the group consiting of m-phenylene, o-phenylene, naphthalene, biphenylene and a radical of the formula

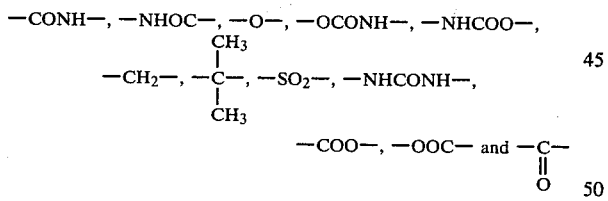

4. A semipermeable membrane as claimed in claim 1, consisting of an aromatic heterocyclecontaining copolyamide of (A) 10 to 95 mole % of one or more unit(s) corresponding to formulae I to IV, in which Ar represents m- or p-phenylene and R, R', R'', R''', R$^{IV}$, R$^V$, R$^{VI}$ and R$^{VII}$ which may be the same or different represent hydrogen, methyl or chlorine, and of (B) 5 to 90 mole % of units corresponding to formula V, in which Ar represents m- or p-phenylene and T represents a bivalent heterocyclic radical which contains one or more aromatic of heterocyclic radicals.

5. A semipermeable membrane as claimed in claim 1, wherein X in Formula (II) represents —O—, —CONH— or —NHOC—.

6. A semipermeable membrane as claimed in claim 1, wherein X and Y in formula (III) independently represents —O—, —NHOC—, —CONH—, NHCOO—, —COO—, —OOC—, or —NHCONH—.

7. A semipermeable membrane as claimed in claim 1, wherein X and Y in formula (IV) represent —O—, —CONH— or —NHOC— and Z represents —SO$_2$— or

8. A semipermeable membrane as claimed in claim 1, wherein T in formula (V) is derived from a diamine with a quinazolin dione structure.

9. A semipermeable membrane as claimed in claim 1, consisting of a copolyamide of 10 to 95 mole % of units corresponding to the formulae

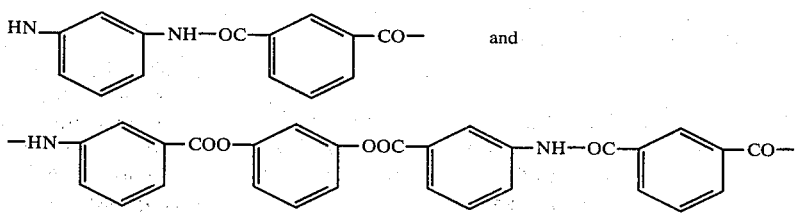

and and 5 to 90 mole % of units corresponding to the formula

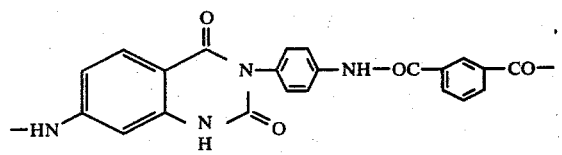

10. A semipermeable membrane as claimed in claim 1, consisting of a copolyamide of 10 to 95 mole % of units corresponding to the formula

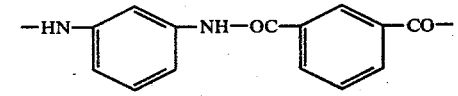

and 5 to 90 mole % of units corresponding to the formula

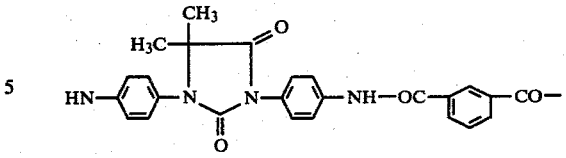

11. A semipermeable membrane as claimed in claim 1, consisting of a copolyamide of 10 to 95 mole % of units corresponding to the formula

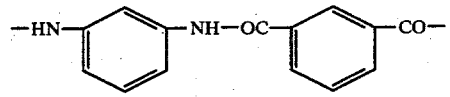

and 5 to 90 mole % of units corresponding to the formula

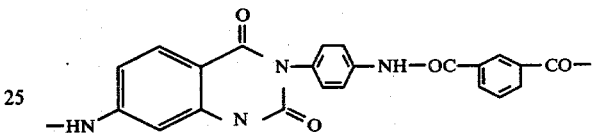

12. A semipermeable membrane as claimed in claim 1, in the form of a film.

* * * * *